United States Patent
Yang et al.

(10) Patent No.: US 12,319,609 B1
(45) Date of Patent: Jun. 3, 2025

(54) GLASS MATERIAL WITH LOW REFRACTIVE INDEX AND RADIATION RESISTANCE, METHOD FOR PREPARING THE SAME, AND APPLICATIONS THEREOF

(71) Applicant: CNBM PHOTONICS TECHNOLOGY CO., LTD., Shandong (CN)

(72) Inventors: Shengyun Yang, Zaozhuang (CN); Zhenbo Cao, Zaozhuang (CN); Meilun Zhang, Zaozhuang (CN); Jinsheng Jia, Zaozhuang (CN); Yang Zhang, Zaozhuang (CN); Jingming Zheng, Zaozhuang (CN); You Zhou, Zaozhuang (CN); Zijin Li, Zaozhuang (CN); Haifeng Lv, Zaozhuang (CN); Sheng Hong, Zaozhuang (CN)

(73) Assignee: CNBM PHOTONICS TECHNOLOGY CO., LTD., Zaozhuang (CN)

( * ) Notice: Subject to any disclaimer, the term of this patent is extended or adjusted under 35 U.S.C. 154(b) by 0 days.

(21) Appl. No.: 18/692,163

(22) PCT Filed: May 30, 2023

(86) PCT No.: PCT/CN2023/097222
§ 371 (c)(1),
(2) Date: Mar. 14, 2024

(87) PCT Pub. No.: WO2024/229908
PCT Pub. Date: Nov. 14, 2024

(30) Foreign Application Priority Data

May 11, 2023 (CN) .......................... 202310540481.4

(51) Int. Cl.
*C03C 13/04* (2006.01)
*C03C 3/118* (2006.01)
(Continued)

(52) U.S. Cl.
CPC ............ *C03C 13/046* (2013.01); *C03C 3/118* (2013.01); *G02B 6/02395* (2013.01); *C03B 25/02* (2013.01); *C03C 2213/00* (2013.01)

(58) Field of Classification Search
None
See application file for complete search history.

(56) References Cited

U.S. PATENT DOCUMENTS

| 5,057,464 A | 10/1991 | Miwa et al. |
| 2002/0032117 A1* | 3/2002 | Peuchert ................ C03C 3/091 501/67 |

(Continued)

FOREIGN PATENT DOCUMENTS

| CN | 102515526 A | 6/2012 |
| CN | 106517772 A | 3/2017 |

(Continued)

OTHER PUBLICATIONS

Jan. 3, 2024 International Search Report issued in International Patent Application No. PCT/CN2023/097222.

(Continued)

*Primary Examiner* — Chris H Chu
(74) *Attorney, Agent, or Firm* — Oliff PLC

(57) ABSTRACT

A glass material with low refractive index and radiation resistance, method for preparing the same, and applications thereof. The glass material consists of the following components by mole percent: 60-80% $SiO_2$, 2-10% $B_2O_3$, 0.1-1% $CeO_2$, 5-10% $Na_2O$, 2-10% $K_2O$, 1-8% $Al_2O_3$, 0-2% $CaF_2$, 0-1% $As_2O_3$, and 1-5% alkaline earth metal oxides, wherein the alkaline earth metal oxides are selected from at (Continued)

least one of BaO, SrO, CaO, and MgO. The glass material has a refractive index of ≤1.47, a glass transition temperature of ≤550° C., a yield point temperature of 645° C., a softening point temperature of ≤748° C., and a coefficient of thermal expansion of $(82-87) \times 10^{-7}/°C$. After exposure to a 4700 Gy dose of X-ray radiation, the transmittance decreases by ≤2%. The glass material can be used as cladding glass material for the preparation of optical glass fibers and fiber panels, capable of meeting the requirements for radiation environment applications.

15 Claims, 1 Drawing Sheet

(51) Int. Cl.
*G02B 6/02* (2006.01)
*C03B 25/02* (2006.01)

(56) References Cited

U.S. PATENT DOCUMENTS

| | | | |
|---|---|---|---|
| 2003/0087745 A1* | 5/2003 | Peuchert | C03C 4/20 501/67 |
| 2003/0087746 A1* | 5/2003 | Ritter | C03C 3/091 501/59 |
| 2011/0165380 A1* | 7/2011 | Gahagan | C03C 3/091 428/156 |

FOREIGN PATENT DOCUMENTS

| | | | | |
|---|---|---|---|---|
| CN | 106565085 A | 4/2017 | | |
| CN | 107032604 A | 8/2017 | | |
| CN | 114171366 A | 3/2022 | | |
| CN | 114988697 A | 9/2022 | | |
| CN | 115304284 A | 11/2022 | | |
| CN | 116253507 A | 6/2023 | | |
| EP | 3543219 A1 * | 9/2019 | | C03C 13/001 |

OTHER PUBLICATIONS

Jan. 3, 2024 Written Opinion issued in International Patent Application No. PCT/CN2023/097222.
Aug. 22, 2023 Office Action issued in Chinese Patent Application No. 202310540481.4.
Cai et al., "Optical component processing technology", Huazhong Institute of Technology Press, Jun. 30, 1987, p. 11.
Xuecheng Bao, "The optical principles and application techniques of photography lenses", Shanghai Jiao Tong University Press, Dec. 31, 1999, p. 216.
Hu et al., "Laser Glass and Its Applications", Shanghai Science and Technology Press, Dec. 31, 2019, p. 120.
Oct. 18, 2023 Office Action issued in Chinese Patent Application No. 202310540481.4.

* cited by examiner

GLASS MATERIAL WITH LOW REFRACTIVE INDEX AND RADIATION RESISTANCE, METHOD FOR PREPARING THE SAME, AND APPLICATIONS THEREOF

The present invention claims priority to a Chinese patent application submitted to the China National Intellectual Property Administration on May 11, 2023, with an application number 202310540481.4, titled "glass material with low refractive index and radiation resistance, method for preparing the same, and applications thereof". The entire contents of this Chinese patent application are incorporated herein by reference and constitute a part of the present invention.

TECHNICAL FIELD

The present invention relates to the field of glass material technology, and specifically relates to a glass material with low refractive index and radiation resistance, method for preparing the same, and applications thereof.

BACKGROUND

Any discussion of prior art throughout the specification should not be construed as an admission that such prior art is widely known or forms part of the common general knowledge in the field.

X-ray detectors are instruments capable of penetrating and imaging the internal structures of the human body, other living organisms, and materials. They have been widely applied in fields such as digital X-ray imaging, veterinary medicine, security inspection, industrial non-destructive testing, and food safety inspection. Optical fiber panels are core technological components in the field of radiology, representing a special class of optical fiber materials. They are a common key technology in the development of modern industry and high-tech industries. The advancement of technology fields such as information, energy, national defense, and advanced manufacturing is inseparable from the development of optical fiber functional materials and their devices. Radiation-resistant optical fiber panels with high X-ray absorption performance are an essential part of digital CT X-ray imaging systems. These panels serve as the substrate for the scintillator in the detector system, while also reducing noise, protecting sensors, and enhancing contrast. This allows observers to see real-time, high-definition images and reduces the exposure of sensors like Charge-Coupled Devices (CCD) and Complementary Metal-Oxide-Semiconductor (CMOS) to X-rays.

Since the dawn of the 21st century, the advent of digital X-ray imaging systems has sparked a surge in demand for X-ray detection and imaging. This is particularly evident in high-end medical imaging, digital CT diagnostics, food safety inspections, and lithium battery X-ray examinations, where there is a critical need for high-definition imaging at substantially increased radiation doses. The emergence of radiation-resistant optical fiber panels, offering high X-ray absorption, high resolution, and large sizes, has successfully met these demands, featuring high X-ray stability, superior resolution, and cost-effectiveness.

However, entry into the radiation-resistant optical fiber panel industry is highly challenging. The market for glass materials used in these panels is predominantly dominated by a few companies, such as Incom, Corning, and SCHOTT. These firms, benefiting from early starts and advantages in capital, technology, and customer resources, have captured a significant share of the global market after years of development. While the domestic industry began later, Chinese manufacturers have gradually mastered the core technology of X-ray imaging systems over two decades. Nevertheless, the reliance on imported core components remains a barrier to the domestication of digital CT systems and the industrial flaw detection sector in China.

In the realm of optical fiber optics, only light entering the fiber at a specific cone angle, known as the acceptance angle $\theta$, can propagate along the fiber. This angle is determined solely by the refractive indices (n) of the core and cladding glasses, wherein: $\sin\theta = \sqrt{n_{core}^2 - n_{cladding}^2}$. A lower refractive index of the cladding glass results in a larger acceptance angle $\theta$, thereby allowing more light to enter the fiber.

It is an object of the present invention to overcome or ameliorate at least one of the disadvantages of the prior art, or to provide a useful alternative. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

SUMMARY

Addressing the deficiencies in the existing technology, the present invention provides a glass material with low refractive index and radiation resistance, method for preparing the same, and applications thereof. A glass material described by the present invention has a refractive index of ≤1.47 and possesses appropriate coefficients of thermal expansion (CTE) and softening temperature characteristics. The glass material can be used as cladding glass material in the manufacturing of optical glass fibers and optical fiber panels. Moreover, the glass material ensures compatibility in viscosity with the core glass material, especially radiation-resistant core glass materials with a refractive index of ≥1.8, facilitating the drawing and forming process. The glass material exhibits good process formability and process compatibility. Optical fiber panels prepared also demonstrate excellent radiation resistance, fundamentally meeting the requirements for applications in radiation environments, solving the core material supply issues and industrial chain security problems for X-ray detectors.

Specifically, the present invention provides one or more of the following technical solutions as described below.

In a first aspect, the present invention provides a glass material for using as a cladding glass, measured in mole percent, the glass material consists of the following components: 60-80% $SiO_2$, 2-10% $B_2O_3$, 0.1-1% $CeO_2$, 5-10% $Na_2O$, 2-10% $K_2O$, 1-8% $Al_2O_3$, 0-2% $CaF_2$, 0-1% $As_2O_3$, and 1-5% alkaline earth metal oxides, wherein the alkaline earth metal oxides are selected from at least one of BaO, SrO, CaO, and MgO.

In the components that compose glass, the silicon dioxide component has a lower refractive index, and increasing its content in the glass can reduce the glass's refractive index to some extent. However, this also leads to an increase in the glass material's softening point temperature (viscosity), creating a primary contradiction encountered in the preparation of low-refractive-index glass materials. Additionally, in the optical field, there is a high demand for radiation stability. Therefore, resolving the aforementioned contradiction and/or enhancing the radiation stability of the glass material and/or ensuring the glass material provides good process formability and process compatibility when preparing optical components or instruments, such as optical fiber panels, is a technical problem the present invention aims to solve. The glass material described in the present invention primarily consists of $SiO_2$, $B_2O_3$, $CeO_2$, alkali metals ($Na_2O$ and $K_2O$), $Al_2O_3$, and alkaline earth metal oxides selected from BaO, SrO, CaO, and MgO as its main basic components. Optionally, it may include $CaF_2$ and/or $As_2O_3$. The various combinations of these components render the glass material described in the present invention with advantages including excellent X-ray absorption and radiation stability, a low refractive index (not exceeding 1.47), while still maintaining a suitable coefficient of thermal expansion and a not too high softening point temperature. Moreover, these superior characteristics enable its use as cladding glass material, well-matched with core glass materials, exhibiting good process formability and compatibility. For instance, when used as cladding glass material in conjunction with core glass materials, especially those with a high refractive index for preparing optical fiber panels, it not only facilitates the drawing and forming process but also enhances the numerical aperture of the optical fiber panels, significantly improving the performance of the optical fiber panels, while also effectively reducing production costs.

For example, in some embodiments of the present invention, measured in mole percent, the glass material consists of the following components: 60-80% $SiO_2$, 2-10% $B_2O_3$, 0.1-1% $CeO_2$, 5-10% $Na_2O$, 2-10% $K_2O$, 1-8% $Al_2O_3$, 0-2% $CaF_2$, 0.1-1% $As_2O_3$, and 1-5% alkaline earth metal oxides, wherein the alkaline earth metal oxides are selected from at least one of BaO, ScO, CaO, and MgO.

For example, in some embodiments of the present invention, measured in mole percent, the glass material consists of the following components: 60-80% $SiO_2$, 2-10% $B_2O_3$, 0.1-1% $CeO_2$, 5-10% $Na_2O$, 2-10% $K_2O$, 1-8% $Al_2O_3$, 0.1-2% $CaF_2$, 0-1% $As_2O_3$, and 1-5% alkaline earth metal oxides, wherein the alkaline earth metal oxides are selected from at least one of BaO, SrO, CaO, and MgO.

For example, in some embodiments of the present invention, measured in mole percent, the glass material consists of the following components: 60-80% $SiO_2$, 2-10% $B_2O_3$, 0.1-1% $CeO_2$, 5-10% $Na_2O$, 2-10% $K_2O$, 1-8% $Al_2O_3$, 0.1-2% $CaF_2$, 0.1-1% $As_2O_3$, and 1-5% alkaline earth metal oxides, wherein the alkaline earth metal oxides are selected from at least one of BaO, SrO, CaO, and MgO.

In the embodiments of the present invention, $SiO_2$ forms the basic framework of the glass structure and is the main component of the cladding glass for radiation-resistant optical fiber panels. In the glass material described by the present invention, a content of $SiO_2$ is maintained at 60-80% in mole percent to preserve the tensile strength properties, chemical stability, as well as the viscosity and coefficient of thermal expansion of the glass. In some embodiments of the present invention, the content of $SiO_2$, measured in mole percent, can be selected from the following ranges: 60-75.1%, 60-70.5%, 60-69.8%, 60-65.8%, 65.8-80%, 65.8-75.1%, 65.8-70.5%, 65.8-69.8%, 69.8-80%, 69.8-75.1%, 69.8-70.5%, 70.5-80%, 70.5-75.1%, 75.1-80%, etc. Preferably, the content of $SiO_2$, measured in mole percent, is 65.8-75.1%, or 65.8-70.5%, or 65.8-69.8%, or 70.5-75.1%, or 69.8-75.1%, or 69.8-70.5%.

$B_2O_3$ is a glass-forming oxide that can form glass by itself. In silicate glasses, boron (B) can partially substitute silicon (Si) to form the network structure. Additionally, $B_2O_3$ has a fluxing effect in the glass, which can reduce the high-temperature viscosity of the glass lower and save cost for production. However, as the content of $B_2O_3$ increases, the range of devitrification in the glass will expand, and $B_2O_3$, being volatile, can cause environmental pollution. Therefore, its quantity should be strictly controlled during the production process. Therefore, in the glass material provided by the present invention, a content of $B_2O_3$ is 2-10%. In some embodiments of the present invention, the content of $B_2O_3$, measured in mole percent, can be selected from the following ranges: 2-9.2%, 2-8.9%, 2-7%, 2-5.2%, 5.2-10%, 5.2-9.2%, 5.2-8.9%, 5.2-7%, 7-10%, 7-9.2%, 7-8.9%, 8.9-10%, 8.9-9.2%, 9.2-10%, etc. Preferably, the content of $B_2O_3$, measured in mole percent, is 5.2-9.2%, or 5.2-8.9%, or 7-9.2%, or 5.2-7%, or 8.9-9.2%, or 9-9.2%.

In the present invention, $CeO_2$ serves as a stabilizer. The introduction of $Ce^{3+}$ has a tendency to capture holes and be oxidized to form $Ce^{3-(+)}$, while $Ce^{4+}$ tends to capture free electrons and be reduced to form $Ce^{4+(-)}$. This prevents the free electrons generated by radiation from entering defects in the glass structure, thereby inhibiting the formation of color centers, and enhancing the radiation stability of the glass. However, excessive introduction of $CeO_2$ can decrease the transmittance of the glass, especially in the near-ultraviolet spectrum, and the addition of $CeO_2$ can increase the refractive index of the glass. Therefore, a content of $CeO_2$ in the glass material of the present invention is controlled at 0.1-1% (measured in mole percent). In some embodiments of the present invention, the content of $CeO_2$, measured in mole percent, can be selected from the following ranges: 0.1-0.2%, 0.1-0.3%, 0.1-0.5%, 0.1-0.6%, 0.2-0.3%, 0.2-0.5%, 0.2-0.6%, 0.2-1%, 0.3-0.5%, 0.3-0.6%, 0.3-1%, 0.5-0.6%, 0.5-1%, 0.6-1%, etc. Preferably, the content of $CeO_2$, measured in mole percent, is 0.3-1%, or 0.1-0.5%, or 0.5-1%, or 0.3-0.5%, or 0.1-0.3%.

$Na_2O$ and $K_2O$ are network modifier oxides in glass. Alkali metal ions within the glass are easily mobile and diffusive. Their appropriate use can reduce the viscosity of glass at high melting temperatures, facilitating easier melting and acting as effective fluxing agents. They also increase the coefficient of thermal expansion of the glass material and decrease the chemical stability and mechanical strength of the glass material. In the glass material described by the present invention, measured in mole percent, a content of $Na_2O$ is 5-10%, a content of $K_2O$ is 2-10%. In some embodiments of the present invention, a total content of $Na_2O$ and $K_2O$ is ≥10%, preferably is 10-20% or 10-13%. In some embodiments of the present invention, the content of $Na_2O$, measured in mole percent, can be selected from the following ranges: 5-9%, 5-8%, 5-7%, 5-6%, 6-10%, 6-9%, 6-8%, 6-7%, 7-10%, 7-9%, 7-8%, 8-10%, 8-9%, 9-10%, etc. The content of $K_2O$, measured in mole percent, can be selected from the following ranges: 2-6.3%, 2-6%, 2-5%, 2-4.8%, 4.8-10%, 4.8-6.3%, 4.8-6%, 4.8-5%, 5-10%, 5-6.3%, 5-6%, 6-10%, 6-6.3%, 6.3-10%, etc.

$Al_2O_3$, serving as a network intermediate in the formation of glass structure, influences the coefficient of thermal expansion of the glass as well as its chemical and thermal stability. $Al_2O_3$ can enhance the mechanical processing capabilities of glass; however, an excessive amount may reduce the viscosity property of glass. In the glass material described by the present invention, measured in mole percent, a content of $Al_2O_3$ is 1-8%. In some embodiments of the present invention, the content of $Al_2O_3$, measured in can be selected from the following ranges: 1-4.1%, 1-3.9%, 1-1.1%, 1.1-8%, 1.1-4.1%, 1.1-3.9%, 3.9-8%, 3.9-4.1%, 4.1-8%, etc. In some embodiments of the present invention, a preferred content of $Al_2O_3$, measured in mole percent, ranges from 1.1% to 4.1%, or 4.1% to 8%.

$CaF_2$ possesses unique dispersion characteristics and is commonly used as an important material for correcting chromatic aberrations in optical systems. In the glass material described by the present invention, measured in mole percent, a content of $CaF_2$ is 0-2%. In some embodiments of the present invention, the content of $CaF_2$, measured in mole percent, can be selected from the following ranges: 0, 0-1.5%, 0-0.5%, 0-0.3%, 0-0.2%, 0.2-2%, 0.2-1.5%, 0.2-0.5%, 0.2-0.3%, 0.3-2%, 0.3-1.5%, 0.3-0.5%, 0.5-2%, 0.5-1.5%, 1.5-2%, etc. Preferably, the content of $CaF_2$, measured in mole percent, is 0-0.2%, or 0-0.3%, or 0-1.5%, or 0.2-1.5%, or 0.3-1.5%, or 1.5-2%.

$As_2O_3$ is commonly used as a fining agent, characterized by its ability to absorb oxygen at low temperatures and release oxygen at high temperatures, which plays a clarifying role in the glass melt. In the present invention, the use of $As_2O_3$ can reduce the melting temperature of the glass and improve the quality of the melt. In the present invention, a content of $As_2O_3$, measured in mole percent, ranges from 0 to 1%. In some embodiments of the present invention, the content of $As_2O_3$, measured in mole percent, can be selected from the following ranges: 0, 0-0.5%, 0-0.2%, 0-0.1%, 0.1-1%, 0.1-0.5%, 0.1-0.2%, 0.2-1%, 0.2-0.5%, 0.5-1%, etc. In some embodiments of the present, a preferred content of $As_2O_3$, measured in mole percent, ranges from 0.5% to 1%, or 0.2% to 0.5%.

In the embodiments of the present invention, measured in mole percent, a total content of $CeO_2$ and $As_2O_3$ is ≥0.1%, preferably is 0.2-1.5%. In some embodiments of the present invention, the total content of $CeO_2$ and $As_2O_3$, measured in mole percent, can be selected from the following ranges: 0.2-1.3%, 0.2-0.7%, 0.2-0.5%, 0.2-0.4%, 0.4-1.5%, 0.4-1.3%, 0.4-0.7%, 0.4-0.5%, 0.5-1.5%, 0.5-1.3%, 0.5-0.7%, 0.7-1.5%, 0.7-1.3%, 1.3-1.5%, etc.

Preferably, the total content of $CeO_2$ and $As_2O_3$, measured in mole percent, is 0.2-1.3%, or 0.2-0.5%, or 0.5-1.5%, or 0.5-1.3%, or 1.3-1.5%.

In the present invention, the addition of at least one type of alkaline earth metal oxide selected from BaO, SrO, CaO, and MgO significantly reduces the phase separation tendency in the glass. Consequently, it is imperative for the glass composition described in the present invention to include at least one selected alkaline earth metal oxide from BaO, SrO, CaO, and MgO, with a content of the alkaline earth metal oxide ranging from 1% to 5% (measured in mole percent).

For example, in some embodiments of the present invention, the alkaline earth metal oxide contains at least MgO, with a content of MgO measured in mole percent and selectable from the following ranges: 1-3.5%, 1-2.6%, 1-2.5%, 1-2.1%, 1-1.8%, 1.8-3.5%, 1.8-2.6%, 1.8-2.5%, 1.8-2.1%, 2.1-3.5%, 2.1-2.6%, 2.1-2.5%, 2.5-3.5%, 2.5-2.6%, 2.6-3.5%; more preferably, the content of MgO, measured in mole percent, is 1-2.5%, or 1.8-2.5%, or 2.1-2.5%, or 1.8-2.1%.

For example, in some embodiments of the present invention, the alkaline earth metal oxide contains at least BaO, with a content of BaO measured in mole percent and selectable from the following ranges: 0-1.5%, 0-1.2%, 0-1%, 0-0.5%, 0.5-1.5%, 0.5-1.2%, 0.5-1%, 1-1.5%, 1-1.2% and 1.2-1.5%; more preferably, the content of BaO, measured in mole percent, is 0, or 0-1%, or 1-1.2%, or 0.5-1%.

For example, in some embodiments of the present invention, the alkaline earth metal oxide contains at least SrO, with a content of SrO measured in mole percent and selectable from the following ranges: 0-0.5%, 0-0.3%, 0-0.2%, 0.2-0.5%, 0.2-0.3% and 0.3-0.5%; more preferably, the content of SrO, measured in mole percent, is 0, or 0.2-0.5%, or 0.3-0.5%.

For example, in some embodiments of the present invention, the alkaline earth metal oxide contains at least CaO, with a content of CaO measured in mole percent and selectable from the following ranges: 0-1%, 0-0.4%, 0-0.2%, 0.2-1%, 0.2-0.4% and 0.4-1%; more preferably, the content of CaO, measured in mole percent, is 0, or 0.2-1%, or 0.4-1%, or 0.2-0.4%.

As preferred examples, in the embodiments of the present invention described above, the alkaline earth metal oxide may be MgO, or a combination of BaO and MgO, or a combination of BaO, SrO, CaO, and MgO. In some embodiments, the content of the alkaline earth metal oxide, measured in mole percent, is 3.5-5%, or 4-5%, or 1-4%, or 3.5-4%.

In the embodiments of the present invention, the glass material described herein contains at least MgO, and may include or exclude at least one selected from BaO, SrO, and CaO. When at least one selected from BaO, SrO, and CaO is included, the content of MgO should account for ≥50% of the total content of alkaline earth metal oxides, preferably 50-100% or 50-75%, more preferably 50-65%, and most preferably 50-52.5%.

The various specific technical features described in the embodiments of the present invention can be combined in any suitable manner without contradiction. To avoid unnecessary repetition, the present invention does not further specify various possible combinations.

Unless specifically stated, the numerical ranges mentioned in the present invention include all values within this range and any range constituted by any two values within this range. For example, the content of $CeO_2$ is 0.1-1%. This range includes all values between 0.1% and any range constituted by any two values (e.g., 0.11%, 0.9%, 0.9/6) within this range (such as 0.11-0.9%). In all embodiments of the present invention, different values of the same indicator that appear can be combined in any manner to form range values.

In some embodiments of the present invention, the glass material is characterized as having a low refractive index and radiation resistance, with a refractive index of ≤1.47, and even more specifically ≤1.46, ≤1.45, ≤1.44, ≤1.43, or ≤1.42. The low refractive index enlarges the angle of light incidence θ, allowing more light to enter the fiber, thereby exhibiting excellent refractive properties. In some embodiments, the refractive index of the glass material described in the present invention ranges from 1.42 to 1.47.

In some embodiments of the present invention, the glass material possesses suitable glass transition temperature (Tg), and/or yield point temperature (Tf), and/or softening point temperature (Ts), and/or coefficient of thermal expansion (CTE). More specifically, the preferred parameters are Tg≤550° C., Tf≤645° C., Ts≤748° C., with a CTE in the range of $(82-87)\times10^{-7}/°$ C. between 20° C. and 300° C.

In some embodiments of the present invention, the glass material exhibits excellent radiation resistance stability, with a transmittance at 560 nm exceeding 90.8% before X-ray irradiation. After exposure to a dose of 4700 Gy of X-rays, the transmittance at 560 nm remains no lower than 89%, generally above 90%. The reduction in transmittance before and after irradiation is ≤2%, preferably ≤1.8, and even more preferably ≤1.5 or ≤1.4. In some embodiments, the glass material described in the present invention exhibits a decrease in transmittance before and after radiation between 1.4% and 1.8%.

In a second aspect, the present invention provides a method for producing the glass material described above in any one of the embodiments of the first aspect, which includes: mixing raw materials, melting, clarifying by stirring, molding by cooling, and precision annealing. The molding may be performed using mechanical molding.

In some embodiments of the present invention, a temperature of melting is 1380-1520° C., a temperature of molding is 1080-1320° C., and a temperature of annealing is 580-610° C. The glass material prepared within this temperature range, according to the components and their proportions disclosed in the first aspect, has stable properties, including but not limited to good refractive performance, heat resistance, process formability, and radiation resistance stability. Understandably, within this temperature range, higher temperatures can shorten the preparation process. If minimizing time costs is necessary, technicians may choose relatively higher temperatures within the disclosed range.

The present invention provides a method for preparing a glass material with low refractive index and radiation resistance. The raw materials used include quartz sand, boric acid, cerium oxide, sodium carbonate or sodium nitrate, potassium carbonate or potassium nitrate, aluminum hydroxide or aluminum oxide, fluorite, arsenic oxide, barium nitrate or barium carbonate, strontium carbonate, calcium carbonate, and magnesium carbonate.

In a third aspect, the present invention provides an optical component made from the glass material described in any one of the embodiments of the first aspect. preferably, the optical component includes but is not limited to, optical glass, fiber optic panels, etc.

In a fourth aspect, the present invention provides an optical glass fiber, having a cladding, wherein the cladding comprises the glass material described in the first aspect above.

In embodiments of the present invention, the optical glass fiber comprises at least a cladding and a core. The glass material described in the present invention serves as a cladding material forming the cladding of the optical glass fiber. The material for the core can be any conventional material used in the field for preparing optical glass fiber cores. Certainly, it is understandable that when used in conjunction with the glass material described in the present invention, it should be compatible with the cladding material in the fiber drawing process. Such materials for the core typically have a higher refractive index, such as rigid fiber-type core glass materials or radiation-resistant glass materials with a high refractive index.

The rigid fiber-type core glass materials can be conventional fiber optic panel core glass materials, or as described in Chinese patent CN201110378012.4. For example, in some embodiments of the present invention, the rigid fiber-type core glass material has a refractive index of 1.85-1.86, a softening temperature of 590-632° C., and a coefficient of thermal expansion at 300° C. of $(89\pm4)\times10^{-7}/°$ C. In some embodiments, its composition may include, by mass percentage, 20-45% BaO, 18-27% $La_2O_3$, 12-20% $B_2O_3$, 5-20% $Nb_2O+Y_2O_4+Ta_2O$, 3-10% $ZrO_2$, 0-6% $Al_2O_3$, 0-5% CaO, 1-1.5% $K_2O$, and 0.5-0.8% $Na_2O$.

For example, in some embodiments of the present invention, the radiation-resistant glass material with a high refractive index has a refractive index of ≥1.8. After exposure to a total X-ray radiation dose of 4700 Gy, its transmission rate decreases by ≤2%, its glass transition temperature is ≥560° C., its yield point temperature is ≥650° C., and its coefficient of thermal expansion between 30° C. and 300° C. is $(85-90)\times10^{-7}/°$ C.

For instance, in some embodiments of the present invention, the radiation-resistant glass with high refractive index (core glass material) consists of the following components by mass percentage: 20-40% $SiO_2$, 0-10% $Al_2O_3$, 0-5% CaO, 5-20% BaO, 40-50% PbO, 1-5% $CeO_2$, 0-5% $La_2O_3$, 0-2% $Nb_2O_5$, 0-2% $Ta_2O_5$, 0-1% $Bi_2O_3$, and 0-1% of alkali metal oxide, selected from $Na_2O$, $K_2O$, $Rb_2O$, and $Cs_2O$.

For example, in yet another set of embodiments, the radiation-resistant glass with high refractive index (core glass material) consists of the following components by mass percentage: 20-40% $SiO_2$, 0-10% $Al_2O_3$, 0-5% CaO, 5-20% BaO, 40-50% PbO, 1-5% $CeO_2$, 0-5% $La_2O_3$, 0-2% $Nb_2O_5$, 0-2% $Ta_2O_5$, 0-1% $Bi_2O_3$, wherein a total content of $La_2O_3$, $Nb_2O$, $Ta_2O_5$ and $Bi_2O_3$ is 1-8%, and 0-1% of alkali metal oxide, selected from at least one of $Na_2O$, $K_2O$, $Rb_2O$ and $Cs_2O$.

For example, in yet another set of embodiments, the radiation-resistant glass with high refractive index (core glass material) consists of the following components by mass percentage: 20-40% $SiO_2$, 2-10% $Al_2O_3$, 1-5% CaO, 5-20% BaO, 40-50% PbO, 1-5% $CeO_2$, 0.5-5% $La_2O_3$, 0-2% $Nb_2O$, 0-2% $Ta_2O_5$, 0-1% $Bi_2O_3$, and 0-1% of alkali metal oxide, selected from $Na_2O$, $K_2O$, $Rb_2O$ and $Cs_2O$.

For example, in yet another set of embodiments, the radiation-resistant glass with high refractive index (core glass material) consists of the following components by mass percentage: 20-40% $SiO_2$, 0-10% $Al_2O_3$, 0-5% CaO, 5-20% BaO, 40-50% PbO, 1-5% $CeO_2$, 0-5% $La_2O_3$, 0-2% $Nb_2O$, 0-2% $Ta_2O_5$, wherein a total content of $La_2O_3$, $Nb_2O$, $Ta_2O$ and $Bi_2O_3$ is 1-8%, and 0-1% of alkali metal oxide, selected from $Na_2O$, $K_2O$, $Rb_2O$ and $Cs_2O$.

For example, in yet another set of embodiments, the radiation-resistant glass with high refractive index (core glass material) consists of the following components by mass percentage: 20-40% $SiO_2$, 0-10% $Al_2O_3$, 0-5% CaO, 5-20% BaO, 40-50% PbO, 1-5% $CeO_2$, 0-5% $La_2O_3$, 0-2% $Nb_2O_5$, 0-2% $Ta_2O$, 0-1% $Bi_2O_3$, and a total content of $La_2O_3$, $Nb_2O_5$, $Ta_2O_5$ and $Bi_2O_3$ is 1-8%.

In the fifth aspect of the present invention, a fiber optic panel is provided, wherein the fiber optic panel includes a cladding, and the cladding includes the glass material described in the first aspect above. For instance, in some embodiments of the present invention, the glass material described can encapsulate a core glass material (which can be as described in the fourth aspect above, such as a rigid fiber-type glass material or a radiation-resistant glass material with high refractive index), through single filament drawing, multiple filament drawing, and the orderly arrangement of the filaments before being melt-pressed into a blank plate segment. The fiber panel is then produced through slicing, rounding, grinding, and polishing, with the dimensions of the fiber panel being customizable, reaching up to meters in size.

The glass material of the present invention, when used as a cladding glass material in combination with a high refractive index (≥1.80) core glass material, results in a fiber optic panel with a numerical aperture greater than 1. Theoretically, light at any angle of incidence can enter the fiber.

The glass material of the present invention has a glass transition temperature (Tg)≤550° C., a yield point temperature (Tf)≤645° C., and a softening point temperature (Ts) ≤748° C.

Compared to the core glass material described in the fourth aspect of the present invention, which has a refractive index of ≥1.8, the Tf of the glass material of the present invention is lower. By using the glass material as the cladding glass material, its viscosity is lower than that of the core glass material, allowing for a good match during the preparation process. This results in excellent process formability and process compatibility.

Moreover, the fiber optic panel provided by the present invention also possesses excellent radiation resistance, fundamentally meeting the application requirements in radiation environments. This resolves the core material supply challenges and industrial chain security issues for X-ray detectors.

Specifically, the core glass material that perfectly matches the glass material described in the present invention (as cladding glass material) for the preparation of optical glass fibers or optical fiber panels can be as described in Chinese patent application CN202310200621.3. The entire contents of this patent are incorporated herein by reference and form a part of the present invention. Both materials can perfectly match during the drawing process, exhibiting excellent process formability and process compatibility. Additionally, the optical fiber panels prepared thereby possess superior radiation resistance performance.

In a sixth aspect, the present invention provides applications of the glass material described in any of the embodiments of the first aspect in the field of optics, especially in the preparation of optical components or instruments. These optical components or instruments include, but are not limited to, optical glass and optical fiber panels, among others.

Compared to the existing technologies, the advantages of the present invention include:

The glass material provided by the present invention exhibits excellent X-ray absorption effects and radiation resistance stability. It possesses a low refractive index (with all indices not exceeding 1.47); while maintaining a low refractive index, it still has suitable coefficients of thermal expansion and not excessively high softening point temperatures, among other properties. Such superior characteristics enable its use as cladding glass material, ensuring good compatibility with core glass materials; excellent process formability and compatibility. For example, when used as cladding glass in conjunction with core glass materials, especially those with high refractive indices for the preparation of optical fiber panels, not only facilitates the drawing and molding process but also improves the numerical aperture of the optical fiber panels, significantly enhancing the performance of the optical fiber panels while effectively reducing production costs. Of course, any product implementing the present invention does not necessarily need to achieve all the advantages mentioned above simultaneously, but the present invention is optimally designed to achieve all these advantages. For instance, the glass material provided by the present invention has a low refractive index of ≤1.47, undergoes a ≤2% decrease in transmittance after X-ray irradiation with a total dose of 4700 Gy, has a glass transition temperature (Tg)≤550° C., a yield point temperature (Tf) ≤645° C., a softening point temperature (Ts)≤748° C., exhibits good radiation resistance performance, can be used as cladding glass, is compatible with core glass materials, has a coefficient of thermal expansion of $(82\text{-}87) \times 10^{-7}/°C.$, possesses good thermal processing performance, facilitating the molding and preparation of large-sized devices, and its comprehensive performance is superior to similar materials both domestically and internationally.

BRIEF DESCRIPTION OF THE DRAWINGS

The accompanying drawings to the specification, which form part of the present application, are used to provide a further understanding of the present application, and the illustrative embodiments of the present application and the description thereof are used to explain the present application and are not unduly limiting the present application. Hereinafter, the embodiments of the present invention are described in detail with reference to the drawings, wherein.

DESCRIPTION OF THE PREFERRED EMBODIMENTS

Figure 1:
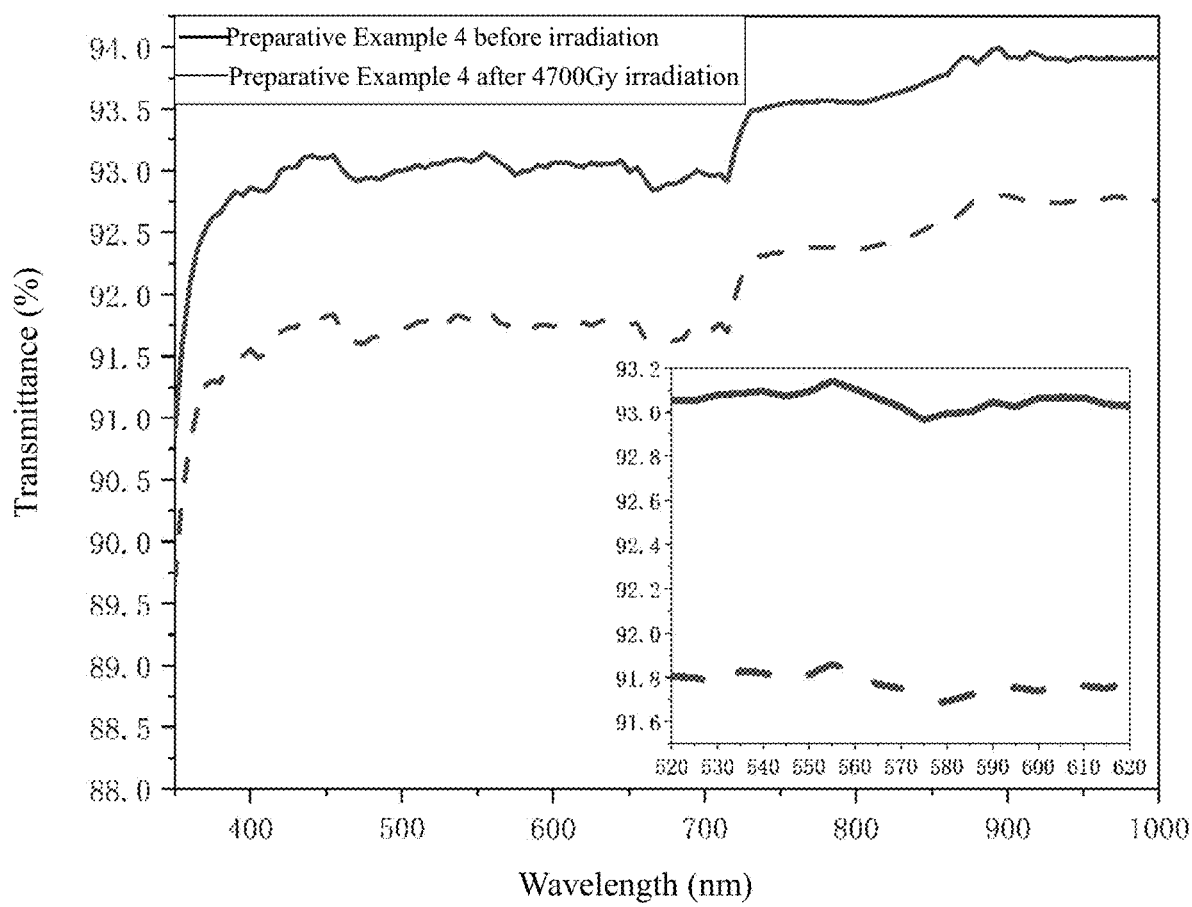
FIG. 1 shows the transmittance (at 560 nm) comparison before and after X-ray irradiation (4700 Gy dose) of the glass material prepared in preparative example 4 of the present invention.

The present invention is further described below with reference to specific examples. It should be understood that these embodiments are intended to illustrate the present application only and not to limit the scope of the present application. Experimental methods for which specific conditions are not indicated in the following embodiments generally follow conventional conditions or follow the conditions recommended by the manufacturer.

Unless otherwise defined, all professional and scientific terms used in the text have the same meaning as those familiar to those skilled in the art. Reagents or raw materials used in the present application are available through conventional means. Unless otherwise specified, reagents or raw materials used in the present application are used in a conventional manner in the field or in accordance with product specifications. In addition, any methods and materials similar or equivalent to those described herein can be used in the methods of the present disclosure. The preferred embodiments described herein are exemplary only.

The present invention provides a glass material with low refractive index and radiation resistance, measured in mole percent, the glass material consists of the following components: 60-80% $SiO_2$, 2-10% $B_2O_3$, 0.1-1% $CeO_2$, 5-10% $Na_2O$, 2-10% $K_2O$, 1-8% $Al_2O_3$, 0-2% $CaF_2$, 0-1% $As_2O_3$, and 1-5% alkaline earth metal oxides, wherein the alkaline earth metal oxides are selected from at least one of BaO, SrO, CaO, and MgO. The glass material according to the present invention possesses appropriate coefficient of thermal expansion and softening temperature, good process formability and adaptability in manufacturing. The glass material according to the present invention can be used as cladding glass material for optical glass fibers and fiber optic panels. The fiber optic panels made from the glass material also exhibit superior radiation resistance, fundamentally meeting the requirements for applications in radiative environments. This resolves the core material supply challenges and industrial chain security issues for X-ray detectors.

Specifically, in the present invention, the glass material with low refractive index and radiation resistance, when composed of the aforementioned components, exhibits exceptional properties in certain embodiments. For example, in some embodiments, a refractive index of the glass material is ≤1.47; in some embodiments, a glass transition temperature of the glass material is ≤550° C.; in some embodiments, a yield point temperature of the glass material is ≤645° C.; in some embodiments, a softening point temperature of the glass material is ≤748° C., matching with the core glass material; in some embodiments, a coefficient of thermal expansion of the glass material is $(82\text{-}87) \times 10^{-7}/°C.$ between 20° C. and 300° C.; and in some embodiments, a transmittance of the glass material is over 91% at 560 nm, which remains above 90% even after irradiation with a 4700 Gy dose of X-rays, with a transmittance reduction of ≤2%.

Moreover, in certain embodiments of the present invention, the glass material exhibits a combination of the above outstanding properties. These glass materials have a refractive index ≤1.47, a glass transition temperature (Tg) of ≤550° C., a yield point temperature (Tf) of ≤645° C., a softening point temperature (Ts) of ≤748° C., a coefficient of thermal expansion of $(82-87) \times 10^{-7}/°$ C., and a decrease in transmittance after exposure to 4700 Gy X-ray radiation ≤2%, or even ≤1.8%, ≤1.6%, or ≤1.5%. They demonstrate superior comprehensive performance, making them particularly suitable for the preparation of radiation-resistant optical components or optical instruments.

Furthermore, the glass material with low refractive index and radiation resistance described herein can be prepared by the following method: proportionally mixing the raw materials, melting the batch materials at a high temperature of 1380-1520° C., clarifying with auxiliary stirring, mechanically drawing and molding at 1080-1320° C., and annealing at 580-610° C. to obtain the glass material with low refractive index and radiation resistance. This method exhibits process stability, and the glass material prepared within this temperature range possesses stable characteristics, including but not limited to good refractive properties, good heat resistance, good processing properties, and good radiation resistance stability. Understandably, within this temperature range, higher temperatures can shorten the preparation process. If minimizing time costs is necessary, technicians may choose relatively higher temperatures within the disclosed range.

Furthermore, in a method for preparing a glass material with low refractive index and radiation resistance provided by the present invention, the raw materials include quartz sand, boric acid, cerium oxide, sodium carbonate or sodium nitrate, potassium carbonate or potassium nitrate, aluminum hydroxide or aluminum oxide, fluorite, arsenic oxide, barium nitrate or barium carbonate, strontium carbonate, calcium carbonate, and magnesium carbonate.

To further illustrate the present invention in greater detail, specific examples are provided below.

Preparative Example 1

The glass material with low refractive index and radiation resistance in this preparative example was composed of the following components in mole percentage: 75.1% $SiO_2$, 7% $B_2O_3$, 0.1% $CeO_2$, 9% $Na_2O$, 6.3% $K_2O$, 1.1% $Al_2O_3$, 0.3% $CaF_2$, 0.1% $As_2O_3$, and 1% MgO.

The method for preparing the glass material with low refractive index and radiation resistance in this preparative example involved using quartz sand, boric acid, cerium oxide, sodium nitrate, potassium carbonate, aluminum hydroxide, fluorite, arsenic oxide, and magnesium carbonate as raw materials. These raw materials were mixed in proportion, melted at 1500° C., clarified with auxiliary stirring, mechanically drawn and molded at 1236° C., and then annealed at 605° C.

The refractive index of the glass sample was tested using a Metricon Model 2010/M Prism Coupler. When a beam of light perpendicular to the plane of incidence entered a V prism, if the refractive index of the sample matched that of the V prism, the light passed through without deviation. If the refractive index of the sample differed from the prism, refraction occurred. By measuring the angle between the refracted and incident light, the refractive index of the sample was calculated using the law of refraction. (GB/T 7962.1-2010) The coefficient of thermal expansion of glass samples was tested using a Netzsch DIL 402 dilatometer. The samples were polished into cylindrical rods of Φ (PHi) 6×50 mm with parallel ends. The heating rate was set at 5° C./min, and the data collection interval was 20 ms. The temperature vs. linear expansion curve was plotted to determine the glass transition and softening temperatures (GB/T 7962.16-2010)

The softening point temperature of the glass samples was tested using a Model PPV-1000/1200 plate viscometer from Orton. The samples were polished into cylindrical rods of Φ (PHi) 6×6 mm with parallel ends. The glass sample is placed between the top and bottom discs, 44 millimeters diameter by 6 millimeters thick discs of a refractory metal alloy. The top metal disc was connected to the bottom of the probe rod. Two thin sheets of platinum foil, 0.001 inch thick by 40 millimeters diameter, lie between the glass sample and top and bottom discs to make sample removal easy. (GB/T 7962.16-2010)

The glass material with low refractive index and radiation resistance prepared by this preparative example had a refractive index of 1.42. After exposure to 4700 Gy of X-ray irradiation, the transmittance of the glass material was 90% (a decrease of 1.4% from before irradiation). The glass transition temperature (Tg) was 543° C., the yield point temperature (Tf) was 632° C., the softening point temperature (Ts) was 740° C., and the coefficient of thermal expansion was $83.8 \times 10^{-7}/°$ C. The glass material demonstrated excellent process formability and compatibility, proving suitable as a cladding material for manufacturing optical glass fibers and fiber panels. The fiber panels produced also showed commendable radiation resistance, meeting the fundamental requirements for applications in radiation environments effectively.

Preparative Example 2

The glass material with low refractive index and radiation resistance in this preparative example was composed of the following components in mole percentage: 70.5% $SiO_2$, 5.2% $B_2O_3$, 0.3% $CeO_2$, 8% $Na_2O$, 2% $K_2O$, 8% $Al_2O_3$, 1% $As_2O_3$, 1% BaO, 0.5% SrO, 1% CaO, and 2.5% MgO.

The method for preparing the glass material with low refractive index and radiation resistance in this preparative example involved using quartz sand, boric acid, cerium oxide, sodium nitrate, potassium carbonate, aluminum hydroxide, arsenic oxide, barium nitrate, strontium carbonate, calcium carbonate, and magnesium carbonate as raw materials. These raw materials were mixed in proportion, melted at 1508° C., clarified with auxiliary stirring, mechanically drawn and molded at 1289° C., and then annealed at 608° C.

The detection method was the same as that used in Preparation Example 1. The glass material with low refractive index and radiation resistance prepared by this preparative example had a refractive index of 1.43. After exposure to 4700 Gy of X-ray irradiation, the transmittance of the glass material was 91.2% (a decrease of 1.5% from before irradiation). The glass transition temperature (Tg) was 550° C., the yield point temperature (Tf) was 639° C., the softening point temperature (Ts) was 745° C., and the coefficient of thermal expansion was $82.9 \times 10^{-7}/°$ C. The glass material demonstrated excellent process formability and compatibility, proving suitable as a cladding material for manufacturing optical glass fibers and fiber panels. The fiber panels produced also showed commendable radiation resistance, meeting the fundamental requirements for applications in radiation environments effectively.

Preparative Example 3

The glass material with low refractive index and radiation resistance in this preparative example was composed of the following components in mole percentage: 80% $SiO_2$, 2% $B_2O_3$, 0.6% $CeO_2$, 6% $Na_2O$, 4.8% $K_2O$, 1% $Al_2O_3$, 0.5% $CaF_2$, 0.1% $As_2O_3$, 1.5% BaO, and 3.5% MgO.

The method for preparing the glass material with low refractive index and radiation resistance in this preparative example involved using quartz sand, boric acid, cerium oxide, sodium nitrate, potassium carbonate, aluminum hydroxide, fluorite, arsenic oxide, barium nitrate and magnesium carbonate as raw materials. These raw materials were mixed in proportion, melted at 1450° C., clarified with auxiliary stirring, mechanically drawn and molded at 1200° C., and then annealed at 601° C.

The detection method was the same as that used in Preparation Example 1. The glass material with low refractive index and radiation resistance prepared by this preparative example had a refractive index of 1.47. After exposure to 4700 Gy of X-ray irradiation, the transmittance of the glass material was 89% (a decrease of 1.8% from before irradiation). The glass transition temperature (Tg) was 537° C., the yield point temperature (Tf) was 628° C., the softening point temperature (Ts) was 733° C., and the coefficient of thermal expansion was $84.9 \times 10^{-7}/°$ C. The glass material demonstrated excellent process formability and compatibility, proving suitable as a cladding material for manufacturing optical glass fibers and fiber panels. The fiber panels produced also showed commendable radiation resistance, meeting the fundamental requirements for applications in radiation environments effectively.

Preparative Example 4

The glass material with low refractive index and radiation resistance in this preparative example was composed of the following components in mole percentage: 65.8% $SiO_2$, 9.2% $B_2O_3$, 1% $CeO_2$, 5% $Na_2O$, 5% $K_2O$, 8% $Al_2O_3$, 1.5% $CaF_2$, 0.5% $As_2O_3$, 1% BaO, 0.5% SrO, 0.4% CaO, and 2.1% MgO.

The method for preparing the glass material with low refractive index and radiation resistance in this preparative example involved using quartz sand, boric acid, cerium oxide, sodium nitrate, potassium carbonate, aluminum oxide, fluorite, arsenic oxide, barium carbonate, strontium carbonate, calcium carbonate, and magnesium carbonate as raw materials. These raw materials were mixed in proportion, melted at 1520° C., clarified with auxiliary stirring, mechanically drawn and molded at 1320° C., and then annealed at 610° C.

The detection method was the same as that used in Preparation Example 1. The glass material with low refractive index and radiation resistance prepared by this preparative example had a refractive index of 1.44. After exposure to 4700 Gy of X-ray irradiation, the transmittance of the glass material was 91.8% (a decrease of 1.4% from before irradiation). The glass transition temperature (Tg) was 550° C., the yield point temperature (Tf) was 645° C., the softening point temperature (Ts) was 748° C., and the coefficient of thermal expansion was $82.0 \times 10^{-7}/°$ C. The glass material demonstrated excellent process formability and compatibility, proving suitable as a cladding material for manufacturing optical glass fibers and fiber panels. The fiber panels produced also showed commendable radiation resistance, meeting the fundamental requirements for applications in radiation environments effectively. FIG. 1 shows the transmittance (at 560 nm) comparison before and after X-ray irradiation (4700 Gy dose) of the glass material prepared in this preparative example.

Preparative Example 5

The glass material with low refractive index and radiation resistance in this preparative example was composed of the following components in mole percentage: 60% $SiO_2$, 10% $B_2O_3$, 0.2% $CeO_2$, 10% $Na_2O$, 10% $K_2O$, 3.9% $Al_2O_3$, 2% $CaF_2$, 0.2% $As_2O_3$, 0.5% BaO, 0.2% SrO, 0.4% CaO, and 2.6% MgO.

The method for preparing the glass material with low refractive index and radiation resistance in this preparative example involved using quartz sand, boric acid, cerium oxide, sodium nitrate, potassium nitrate, aluminum hydroxide, fluorite, arsenic oxide, barium carbonate, strontium carbonate, calcium carbonate, and magnesium carbonate as raw materials. These raw materials were mixed in proportion, melted at 1380° C., clarified with auxiliary stirring, mechanically drawn and molded at 1080° C., and then annealed at 580° C.

The detection method was the same as that used in Preparation Example 1. The glass material with low refractive index and radiation resistance prepared by this preparative example had a refractive index of 1.46. After exposure to 4700 Gy of X-ray irradiation, the transmittance of the glass material was 90.2% (a decrease of 1.8% from before irradiation). The glass transition temperature (Tg) was 525° C., the yield point temperature (Tf) was 619° C., the softening point temperature (Ts) was 724° C., and the coefficient of thermal expansion was $87 \times 10^{-7}/°$ C. The glass material demonstrated excellent process formability and compatibility, proving suitable as a cladding material for manufacturing optical glass fibers and fiber panels. The fiber panels produced also showed commendable radiation resistance, meeting the fundamental requirements for applications in radiation environments effectively.

Preparative Example 6

The glass material with low refractive index and radiation resistance in this preparative example was composed of the following components in mole percentage: 69.8% $SiO_2$, 8.9% $B_2O_3$, 0.5% $CeO_2$, 7% $Na_2O$, 6% $K_2O$, 4.1% $Al_2O_3$, 0.2% $CaF_2$, 1.2% BaO, 0.3% SrO, 0.2% CaO, and 1.8% MgO.

The method for preparing the glass material with low refractive index and radiation resistance in this preparative example involved using quartz sand, boric acid, cerium oxide, sodium nitrate, potassium carbonate, aluminum oxide, fluorite, arsenic oxide, strontium carbonate, calcium carbonate, and magnesium carbonate as raw materials. These raw materials were mixed in proportion, melted at 1420° C., clarified with auxiliary stirring, mechanically drawn and molded at 1130° C., and then annealed at 588° C.

The detection method was the same as that used in Preparation Example 1. The glass material with low refractive index and radiation resistance prepared by this preparative example had a refractive index of 1.45. After exposure to 4700 Gy of X-ray irradiation, the transmittance of the glass material was 90.9% (a decrease of 1.4% from before irradiation). The glass transition temperature (Tg) was 530° C., the yield point temperature (Tf) was 624° C., the softening point temperature (Ts) was 728° C., and the coefficient of thermal expansion was 86.3×10$^{-7}$/° C. The glass material demonstrated excellent process formability and compatibility, proving suitable as a cladding material for manufacturing optical glass fibers and fiber panels. The fiber panels produced also showed commendable radiation resistance, meeting the fundamental requirements for applications in radiation environments effectively.

Comparative Preparation Example 1

The glass material in this comparative example was composed of the following components in mole percentage: 70% $SiO_2$, 7.5% $B_2O_3$, 1.5% $CeO_2$, 10% $Na_2O$, 8.5% $K_2O$, 1% $Al_2O_3$, 0.5% $CaF_2$, and 1% MgO.

The method for preparing the glass material in this comparative example involved using quartz sand, boric acid, cerium oxide, sodium nitrate, potassium nitrate, aluminum hydroxide, fluorite, and magnesium carbonate as raw materials. These raw materials were mixed in proportion and then prepared according to the method described in Preparation Example 1.

The detection method was the same as that used in Preparation Example 1. The refractive index of the glass material of this comparative example is 1.55. After exposure to 4700 Gy of X-ray irradiation, the transmittance of the glass material was 82.3% (a decrease of 3.7% from before irradiation). The glass transition temperature (Tg) was 538° C., the yield point temperature (Tf) was 626° C., the softening point temperature (Ts) was 727° C., and the coefficient of thermal expansion was 88.1×10$^{-7}$/°.

Comparative Preparation Example 2

The glass material in this comparative example was composed of the following components in mole percentage: 65% $SiO_2$, 7.5% $B_2O_3$, 1% $CeO_2$, 10% $Na_2O$, 8.5% $K_2O$, 1% $Al_2O_3$, 1% $CaF_2$, 5% CaO and 1% MgO.

The method for preparing the glass material in this comparative example involved using quartz sand, boric acid, cerium oxide, sodium nitrate, potassium carbonate, aluminum hydroxide, fluorite, calcium carbonate and magnesium carbonate as raw materials. These raw materials were mixed in proportion and then prepared according to the method described in Preparation Example 1.

The detection method was the same as that used in Preparation Example 1. The refractive index of the glass material of this comparative example is 1.67. After exposure to 4700 Gy of X-ray irradiation, the transmittance of the glass material was 86.1% (a decrease of 4.5% from before irradiation). The glass transition temperature (Tg) was 509° C., the yield point temperature (Tf) was 607° C., the softening point temperature (Ts) was 710° C., and the coefficient of thermal expansion was 92.7×10$^{-7}$/° C.

Comparative Preparation Example 3

The glass material in this comparative example was composed of the following components in mole percentage: 82% $SiO_2$, 8% $B_2O_3$, 3% $CeO_2$, 1% $K_2O$, 3% $Al_2O_3$, 1% $As_2O_3$, and 2% MgO.

The method for preparing the glass material in this comparative example involved using quartz sand, boric acid, cerium oxide, potassium nitrate, aluminum hydroxide, fluorite, arsenic oxide and magnesium carbonate as raw materials. These raw materials were mixed in proportion and then prepared according to the method described in Preparation Example 1.

The detection method was the same as that used in Preparation Example 1. The refractive index of the glass material of this comparative example is 1.6. The glass transition temperature (Tg) was 560° C. After exposure to 4700 Gy of X-ray irradiation, the transmittance of the glass material was 79.5% (a decrease of 4.7% from before irradiation). The yield point temperature (Tf) was 658° C., the softening point temperature (Ts) was 802° C., and the coefficient of thermal expansion was 78.1×10$^{-7}$/° C.

Comparative Preparation Example 4

The glass material in this comparative example was composed of the following components in mole percentage: 73.2% $SiO_2$, 7.3% $B_2O_3$, 7.0% $NaO_2$, 3.0% $K_2O$, 3.5% $Al_2O_3$, 1% $CaF_2$, 2% CaO and 3% MgO.

The method for preparing the glass material in this comparative example involved using quartz sand, boric acid, cerium oxide, sodium nitrate, potassium carbonate, aluminum hydroxide, fluorite, calcium carbonate and magnesium carbonate as raw materials. These raw materials were mixed in proportion and then prepared according to the method described in Preparation Example 1.

The detection method was the same as that used in Preparation Example 1. The refractive index of the glass material of this comparative example is 1.52. After exposure to 4700 Gy of X-ray irradiation, the transmittance of the glass material was 78.7% (a decrease of 9.4% from before irradiation). The glass transition temperature (Tg) was 552° C., the yield point temperature (Tf) was 647° C., the softening point temperature (Ts) was 766° C., and the coefficient of thermal expansion was 82.5-10$^{-7}$/° C.

EXAMPLES

In the examples of the present invention, the prepared glass material was used in the optical field, for the fabrication of optical components or optical instruments, such as optical glass and fiber panels, among others. The following examples illustrate the preparation of a fiber panel.

Figure 2:
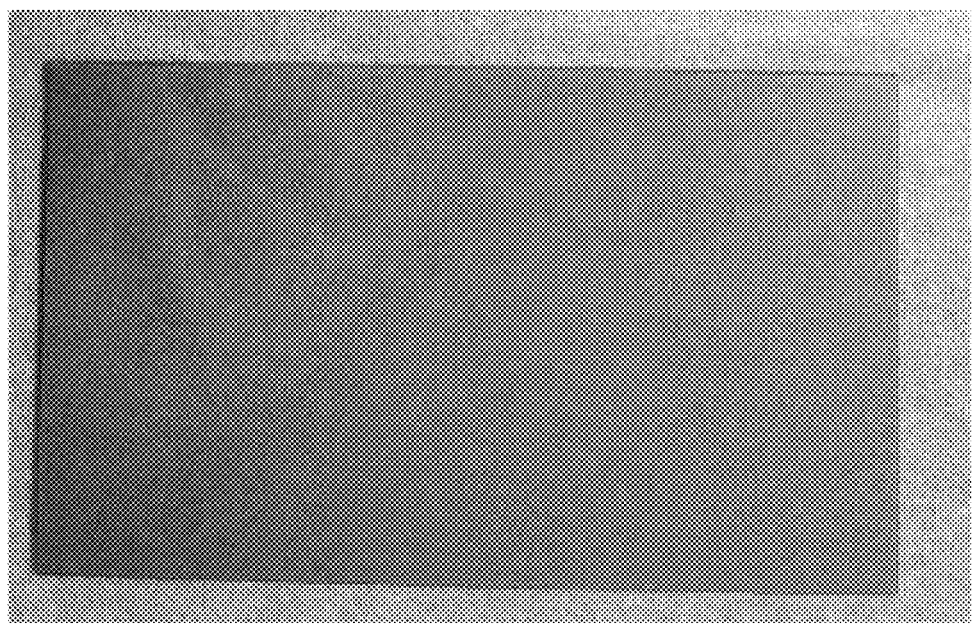
FIG. 2 shows a photograph of a large-sized (140×90×2 $mm^3$) radiation-resistant fiber optic panel made using the glass material of the present invention.

The glass material of the present invention encapsulated a core glass material (such as a rigid fiber-type glass material or a radiation-resistant glass material with high refractive index), through single filament drawing, multiple filament drawing, and the orderly arrangement of the filaments before being melt-pressed into a blank plate segment. The fiber panel is then produced through slicing, rounding, grinding, and polishing, with the dimensions of the fiber panel being customizable, reaching up to meters in size. FIG. 2 shows a photograph of a large-sized (140×90×2 mm$^3$) radiation-resistant fiber optic panel made using the glass material of the present invention.

The rigid fiber-type core glass can be a conventional core glass material for fiber panels or as described in Chinese patent CN201110378012.4. The radiation-resistant glass material with high refractive index, such as the one detailed in Chinese patent CN202310200621.3, is particularly effective when used as the core glass material in conjunction with the glass material of the present invention (serving as cladding glass) for fabricating fiber panels. This combination ensures a perfect match during the drawing process, exhibiting excellent moldability and compatibility. Moreover, the fiber panels produced exhibit superior radiation resistance.

Example 1

The core glass material was composed of the following components by mass percentage: 36% BaO, 25.2% $La_2O_3$, 14% $B_2O_3$, 5.9% $Nb_2O_5$, 6.3% $Ta_2O_5$, 5.1% $ZrO_2$, 3.2% $Al_2O_3$, 2.2% CaO, 1.5% $K_2O$, and 0.6% $Na_2O$. The refractive index of the core glass material was 1.864, with a transmittance of 80.83% after irradiation with 4700 Gy of X-rays (a decrease of 1.18% from before irradiation), a glass transition temperature of 619° C., and a coefficient of thermal expansion of $92.4 \times 10^{-7}$/° C.

The glass material from Preparative Example 4 of the present invention was used as the cladding material for the optical fiber panel, matched with the aforementioned core glass material. The core material was encapsulated by the cladding material, through single filament drawing, multiple filament drawing, and the orderly arrangement of the filaments before being melt-pressed into a blank plate segment. The fiber panel was then produced through slicing, rounding, grinding, and polishing. The transmittance of the fiber panel at a wavelength of 560 nm was tested before and after exposure to 4700 Gy of X-ray radiation, showing transmittance values of 71.2% and 53.9%, respectively (a decrease of 17.3%).

Example 2

The core glass material was composed of the following components by mass percentage: 27.5% $SiO_2$, 2% $Al_2O_3$, 5% CaO, 8% BaO, 50% PbO, 3% $CeO_2$, 2% $La_2O_3$, 0.5% $Nb_2O_5$, 1% $Ta_2O$, 0.5% $Rb_2O$ and 0.5% $Cs_2O$. The refractive index of the core glass material was 1.83, with a transmittance of 80.83% after irradiation with 4700 Gy of X-rays (a decrease of 1.18% from before irradiation), a glass transition temperature of 574° C., a yield point temperature of 680° C. and a coefficient of thermal expansion of $86.2 \times 10^{-7}$/° C.

The glass material from Preparative Example 4 of the present invention was used as the cladding material for the optical fiber panel, matched with the aforementioned core glass material. The core material was encapsulated by the cladding material, through single filament drawing, multiple filament drawing, and the orderly arrangement of the filaments before being melt-pressed into a blank plate segment. The fiber panel was then produced through slicing, rounding, grinding, and polishing. The transmittance of the fiber panel at a wavelength of 560 nm was tested before and after exposure to 4700 Gy of X-ray radiation, showing transmittance values of 81.1% and 80.4%, respectively (a decrease of 0.7%).

Additionally, fiber panels prepared using glass materials obtained from other preparative examples of the present invention, matched with the aforementioned core glass materials, also exhibited good radiation resistance. The decrease in transmittance at 560 nm, before and after exposure to 4700 Gy of X-ray radiation, was ≤0.89% for the fiber panels obtained.

Comparative Example 1

The core glass material was composed of the following components by mass percentage: 27.5% $SiO_2$, 2% $Al_2O_3$, 5% CaO, 8% BaO, 50% PbO, 3% $CeO_2$, 2% $La_2O_3$, 0.5% $Nb_2O_5$, 1% $Ta_2O$, 0.5% $Rb_2O$ and 0.5% $Cs_2O$. The refractive index of the core glass material was 1.83, with a transmittance of 80.83% after irradiation with 4700 Gy of X-rays (a decrease of 1.18% from before irradiation), a glass transition temperature of 574° C., a yield point temperature of 680° C. and a coefficient of thermal expansion of $86.2 \times 10^{-7}$/° C.

The cladding glass material was composed of the following components in mole percentage: 78.2% $SiO_2$, 1.8% $Al_2O_3$, 4.4% $B_2O_3$, 1.5% CaO, 1.5% $Li_2O$, 5.0% $Na_2O$, 7.0% $K_2O$, 0.5% $F_2$ and 0.1% $SnO_2$. The refractive index of the cladding glass material was 1.46, the yield point temperature (Tf) was 688° C., the softening point temperature (Ts) was 759° C., and the coefficient of thermal expansion was $78 \times 10^{-7}$/° C.

Using the two types of glass materials as core and cladding, the core material was encapsulated by the cladding material, through single filament drawing, multiple filament drawing, and the orderly arrangement of the filaments before being melt-pressed into a blank plate segment. The fiber panel was then produced through slicing, rounding, grinding, and polishing. The transmittance of the fiber panel at a wavelength of 560 nm was tested before and after exposure to 4700 Gy of X-ray radiation, showing transmittance values of 78.5% and 73.2%, respectively (a decrease of 5.3%).

Comparative Example 2

The core glass material was composed of the following components by mass percentage: 36% BaO, 25.2% $La_2O_3$, 14% $B_2O_3$, 5.9% $Nb_2O_5$, 6.3% $Ta_2O$, 5.1% $ZrO_2$, 3.2% $Al_2O_3$, 2.2% CaO, 1.5% $K_2O$, and 0.6% $Na_2O$. The refractive index of the core glass material was 1.864, with a transmittance of 80.83% after irradiation with 4700 Gy of X-rays (a decrease of 1.18% from before irradiation), a glass transition temperature of 619° C., and a coefficient of thermal expansion of $92.4 \times 10^{-7}$/° C.

The cladding glass material was composed of the following components in mole percentage: 78.2% $SiO_2$, 1.8% $Al_2O_3$, 4.4% $B_2O_3$, 1.5% CaO, 1.5% $Li_2O$, 5.0% $Na_2O$, 7.0% $K_2O$, 0.5% $F_2$ and 0.1% $SnO_2$. The refractive index of the cladding glass material was 1.46, the yield point temperature (TO) was 688° C., the softening point temperature (Ts) was 759° C., and the coefficient of thermal expansion was $78 \times 10^{-7}$/° C.

Using the two types of glass materials as core and cladding, the core material was encapsulated by the cladding material, through single filament drawing, multiple filament drawing, and the orderly arrangement of the filaments before being melt-pressed into a blank plate segment. The fiber panel was then produced through slicing, rounding, grinding, and polishing. The transmittance of the fiber panel at a wavelength of 560 nm was tested before and after exposure to 4700 Gy of X-ray radiation, showing transmittance values of 66.6% and 23.3%, respectively (a decrease of 43.3%).

Table 1 and Table 2 respectively summarized the compositions and glass properties of the preparative examples and comparative preparation examples illustratively disclosed in the present invention.

TABLE 1

Composition of glass samples from Preparative Examples 1-6 and Comparative Preparation Examples 1-4.

| mol % | Preparative Example | | | | | | Comparative Preparation Example | | | |
|---|---|---|---|---|---|---|---|---|---|---|
| | 1 | 2 | 3 | 4 | 5 | 6 | 1 | 2 | 3 | 4 |
| $SiO_2$ | 75.1 | 70.5 | 80.0 | 65.8 | 60.0 | 69.8 | 70.0 | 65.0 | 82.0 | 73.2 |
| $B_2O_3$ | 7.0 | 5.2 | 2.0 | 9.2 | 10.0 | 8.9 | 7.5 | 7.5 | 8.0 | 7.3 |
| $CeO_2$ | 0.1 | 0.3 | 0.6 | 1.0 | 0.2 | 0.5 | 1.5 | 1.0 | 3.0 | 0.0 |
| $Na_2O$ | 9.0 | 8.0 | 6 | 5.0 | 10.0 | 7.0 | 10.0 | 10.0 | 0.0 | 7.0 |
| $K_2O$ | 6.3 | 2.0 | 4.8 | 5.0 | 10.0 | 6.0 | 8.5 | 8.5 | 1.0 | 3.0 |
| $Al_2O_3$ | 1.1 | 8.0 | 1.0 | 8.0 | 3.9 | 4.1 | 1.0 | 1.0 | 3.0 | 3.5 |
| $CaF_2$ | 0.3 | 0.0 | 0.5 | 1.5 | 2.0 | 0.2 | 0.5 | 1.0 | 0.0 | 1.0 |
| $As_2O_3$ | 0.1 | 1.0 | 0.1 | 0.5 | 0.2 | 0.0 | 0.0 | 0.0 | 1.0 | 0.0 |
| BaO | 0.0 | 1.0 | 1.5 | 1.0 | 0.5 | 1.2 | 0.0 | 0.0 | 0.0 | 0.0 |
| SrO | 0.0 | 0.5 | 0 | 0.5 | 0.2 | 0.3 | 0.0 | 0.0 | 0.0 | 0.0 |
| CaO | 0.0 | 1.0 | 0 | 0.4 | 0.4 | 0.2 | 0.0 | 5.0 | 0.0 | 2.0 |
| MgO | 1.0 | 2.5 | 3.5 | 2.1 | 2.6 | 1.8 | 1.0 | 1.0 | 2.0 | 3.0 |
| Sum of Contents | 100 | 100 | 100 | 100 | 100 | 100 | 100 | 100 | 100 | 100 |

TABLE 2

Test Results of the Properties of Glass Samples from Preparative Examples 1 to 6, and Comparative Preparation Examples 1 to 4.

| | | Preparative Example | | | | | | Comparative Preparation Example | | | |
|---|---|---|---|---|---|---|---|---|---|---|---|
| | | 1 | 2 | 3 | 4 | 5 | 6 | 1 | 2 | 3 | 4 |
| Refractive Index | | 1.42 | 1.43 | 1.47 | 1.44 | 1.46 | 1.45 | 1.55 | 1.67 | 1.6 | 1.52 |
| Transmittance at 560 nm (%) | Before X-ray Irradiation | 91.4 | 92.7 | 90.8 | 93.2 | 92 | 92.3 | 86 | 90.6 | 84.2 | 88.1 |
| | After 4700 Gy X-Ray Irradiation | 90 | 91.2 | 89 | 91.8 | 90.2 | 90.9 | 82.3 | 86.1 | 79.5 | 78.7 |
| | Decrease (%) | 1.4 | 1.5 | 1.8 | 1.4 | 1.8 | 1.4 | 3.7 | 4.5 | 4.7 | 9.4 |
| Glass Transition Temperature (Tg) (° C.) | | 543 | 550 | 537 | 550 | 525 | 530 | 538 | 509 | 560 | 552 |
| Yield point temperature (Tf) (° C.) | | 632 | 639 | 628 | 645 | 619 | 624 | 626 | 607 | 658 | 647 |
| Softening point temperature (Ts) (° C.) | | 740 | 745 | 733 | 748 | 724 | 728 | 727 | 710 | 802 | 766 |
| (20° C.-300° C.) Coefficient of Thermal Expansion (CTE) ($\times 10^7$/° C.) | | 83.8 | 82.9 | 84.9 | 82 | 87 | 86.3 | 88.1 | 92.7 | 78.1 | 82.5 |

From Table 2, it is evident that the glass material provided by the present invention had a refractive index of ≤1.47, a glass transition temperature (Tg) of ≤550° C., a yield point temperature (Tf) of ≤645° C., and a softening point temperature (Ts) of 5748° C., indicating good process formability and compatibility. The coefficient of thermal expansion between 20° C. and 300° C. of the glass material was $(82-87) \times 10^{-7}$/° C., demonstrating favorable thermal processing performance, which is beneficial for the molding and preparation of large-sized devices. Compatible with core glass materials, the glass material provided by the present invention could serve as cladding glass material for the production of optical glass fibers and fiber panels. The transmittance decrease before and after exposure to a dose of 4700 Gy of X-ray radiation was ≤2%, indicating that the fiber panels produced from the glass material of the present invention also possessed good radiation resistance, fundamentally meeting the requirements for applications in radiation environments.

The various specific technical features described in the embodiments of the present invention can be combined in any suitable manner without contradiction. To avoid unnecessary repetition, the present invention does not further specify various possible combinations.

The above descriptions are merely preferred embodiments of the present invention and are not intended to limit the present invention. For those skilled in the art, various changes and modifications can be made to the present invention. Any modification, equivalent replacement, or improvement made within the spirit and principles of the present invention should be included within the scope of the present invention's protection.

The invention claimed is:

1. A glass material, consisting of the following components by mole percent: 65.8-69.8% $SiO_2$, 8.9-10% $B_2O_3$, 0.1-1% $CeO_2$, 5-10% $Na_2O$, 2-10% $K_2O$, 1-8% $Al_2O_3$, 1.5-2% $CaF_2$, 0.1-1% $As_2O_3$, and 1-5% alkaline earth metal oxides, wherein the alkaline earth metal oxides are a combination of BaO, SrO, CaO, and MgO, wherein a total content of $CeO_2$ and $As_2O_3$ is 0.2-1.5%, a content of MgO is 1.8-2.6%, a content of CaO is 0.2-0.4%, the content of MgO accounts for ≥50% of a total content of alkaline earth metal oxides.

2. The glass material according to claim 1, wherein a content of BaO is 0.5-1.5% by mole percent.

3. The glass material according to claim 1, wherein a content of SrO is 0.2-0.5% by mole percent.

4. The glass material according to claim 1, wherein the content of MgO accounts for 50-75% of the total content of alkaline earth metal oxides.

5. The glass material according to claim 1, wherein a total content of $Na_2O$ and $K_2O$ is 210%.

6. The glass material according to claim 1, wherein a total content of $Na_2O$ and $K_2O$ is 10-20%.

7. The glass material according to claim 1, wherein the glass material has a refractive index of ≤1.47, a glass transition temperature (Tg) of ≤550° C., a yield point temperature (Tf) of ≤645° C., a softening point temperature (Ts) of ≤748° C., a coefficient of thermal expansion at 20° C. to 300° C. of $(82-87)\times10^{-7}$/° C., a transmittance at 560 nm of ≥90.8%, and a decrease in transmittance at 560 nm after exposure to a dose of 4700 Gy of X-ray radiation of ≤2%.

8. A method for preparing the glass material according to claim 1, comprising: mixing raw materials, melting, clarifying by stirring, molding by cooling, and annealing.

9. The method according to claim 8, wherein a temperature of melting is 1380-1520° C., a temperature of molding is 1080-1320° C., and a temperature of annealing is 580-610° C.

10. An optical component made from the glass material according to claim 1.

11. An optical glass fiber, comprising at least a cladding and a core, wherein the cladding comprises the glass material according to claim 1.

12. The optical glass fiber according to claim 11, wherein the core comprises a radiation-resistant glass material having a refractive index of ≥1.8.

13. The optical glass fiber according to claim 12, wherein the radiation-resistant glass material has a refractive index of ≥1.8, a transmittance decrease of ≤2% after exposure to a total dose of 4700 Gy of X-ray radiation, a glass transition temperature of ≥560° C., a yield point temperature of ≥650° C., and a coefficient of thermal expansion of $(85-90)\times10^{-7}$/° C. from 30° C. to 300° C.

14. The optical glass fiber according to claim 12, wherein the radiation-resistant glass material has the following composition by weight percent: 20-40% $SiO_2$, 0-10% $Al_2O_3$, 0-5% CaO, 5-20% BaO, 40-50% PbO, 1-5% $CeO_2$, 0-5% $La_2O_3$, 0-2% $Nb_2O_5$, 0-2% $Ta_2O_5$, 0-1% $Bi_2O_3$, and 0-1% oxides selected from $Na_2O$, $K_2O$, $Rb_2O$, and $Cs_2O$.

15. An optical fiber panel, having a cladding comprising the glass material according to claim 1.

* * * * *